R. C. BARTLETT.
BUG AND WORM COLLECTOR.
APPLICATION FILED OCT. 17, 1913.
1,108,882.
Patented Sept. 1, 1914.
3 SHEETS—SHEET 1.
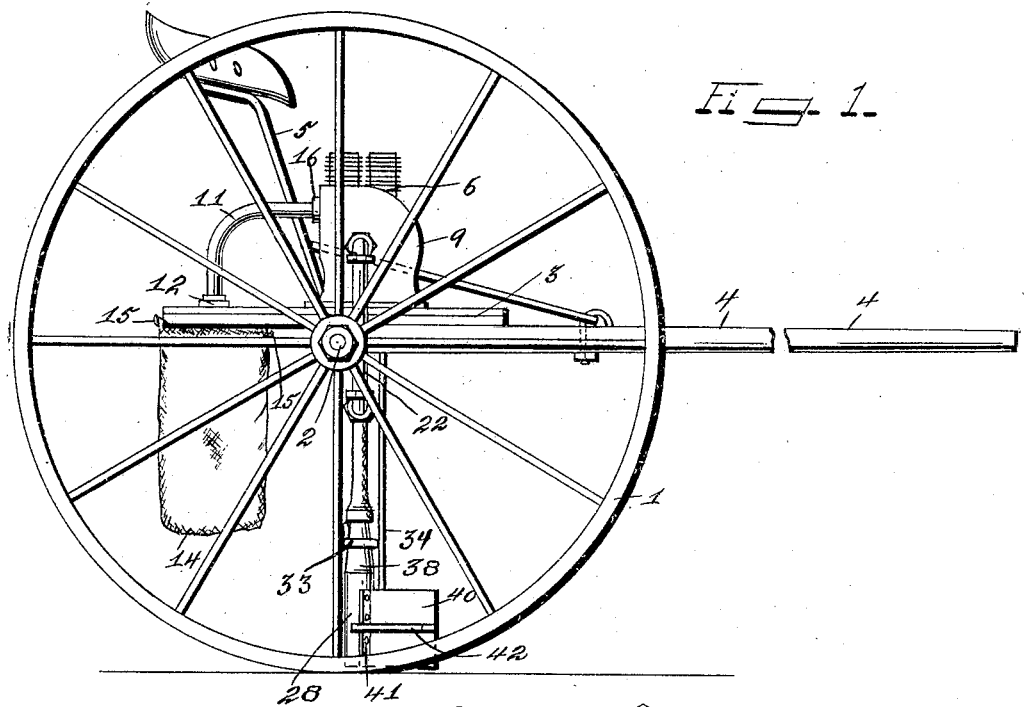
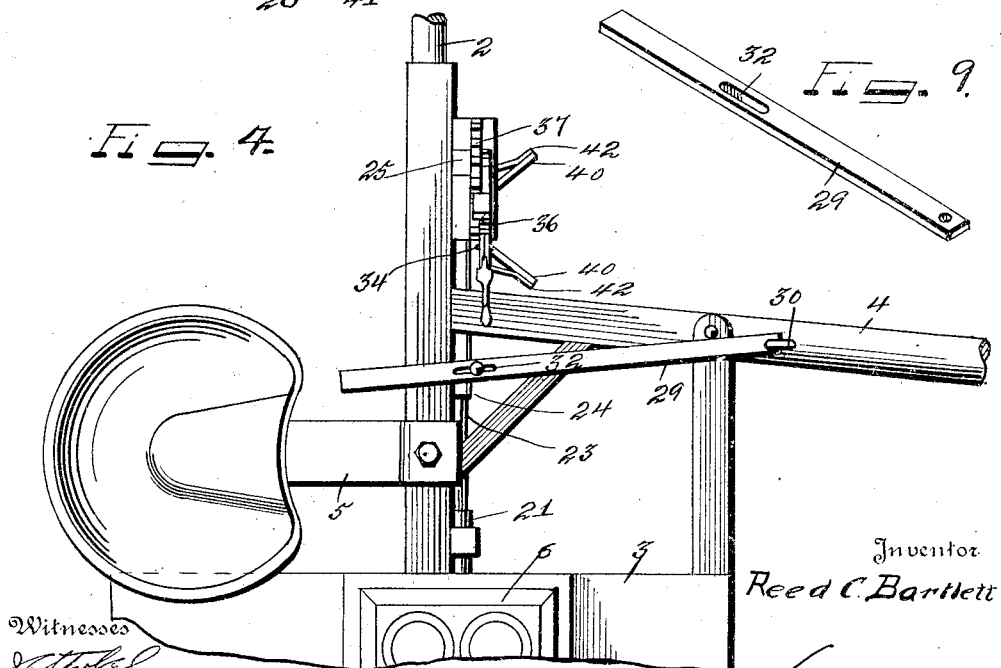
Inventor
Reed C. Bartlett R. C. BARTLETT.
BUG AND WORM COLLECTOR.
APPLICATION FILED OCT. 17, 1913.
1,108,882.
Patented Sept. 1, 1914.
3 SHEETS—SHEET 2.
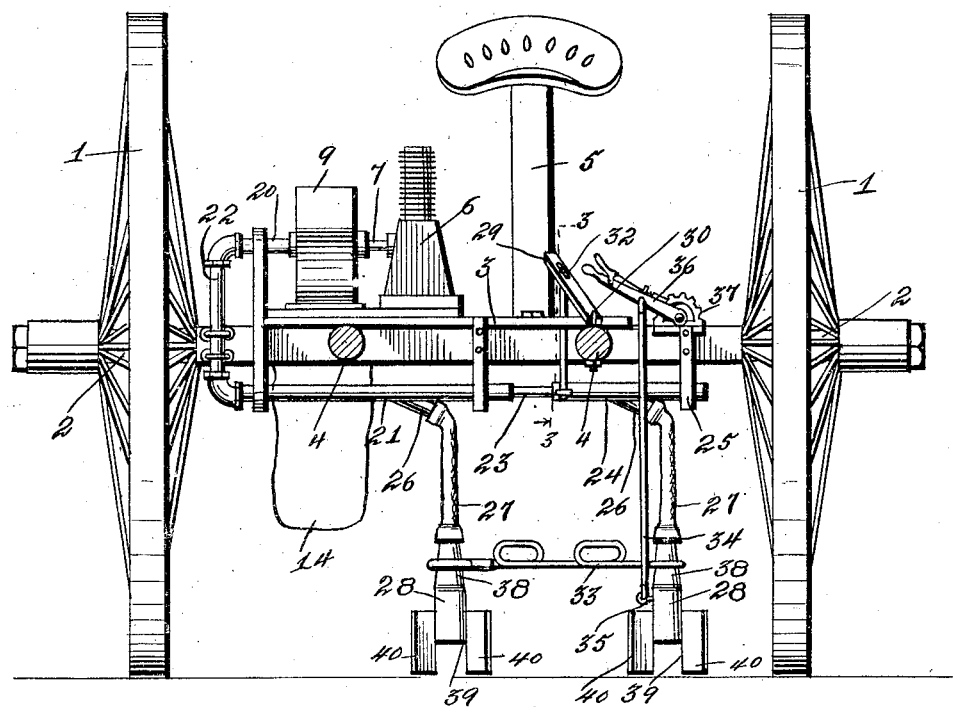
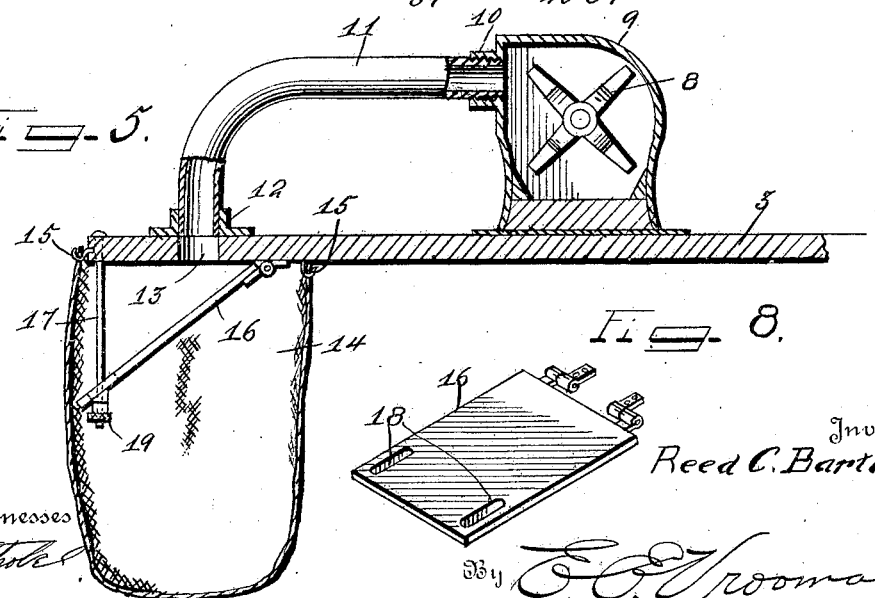
Inventor
Reed C. Bartlett.
Witnesses

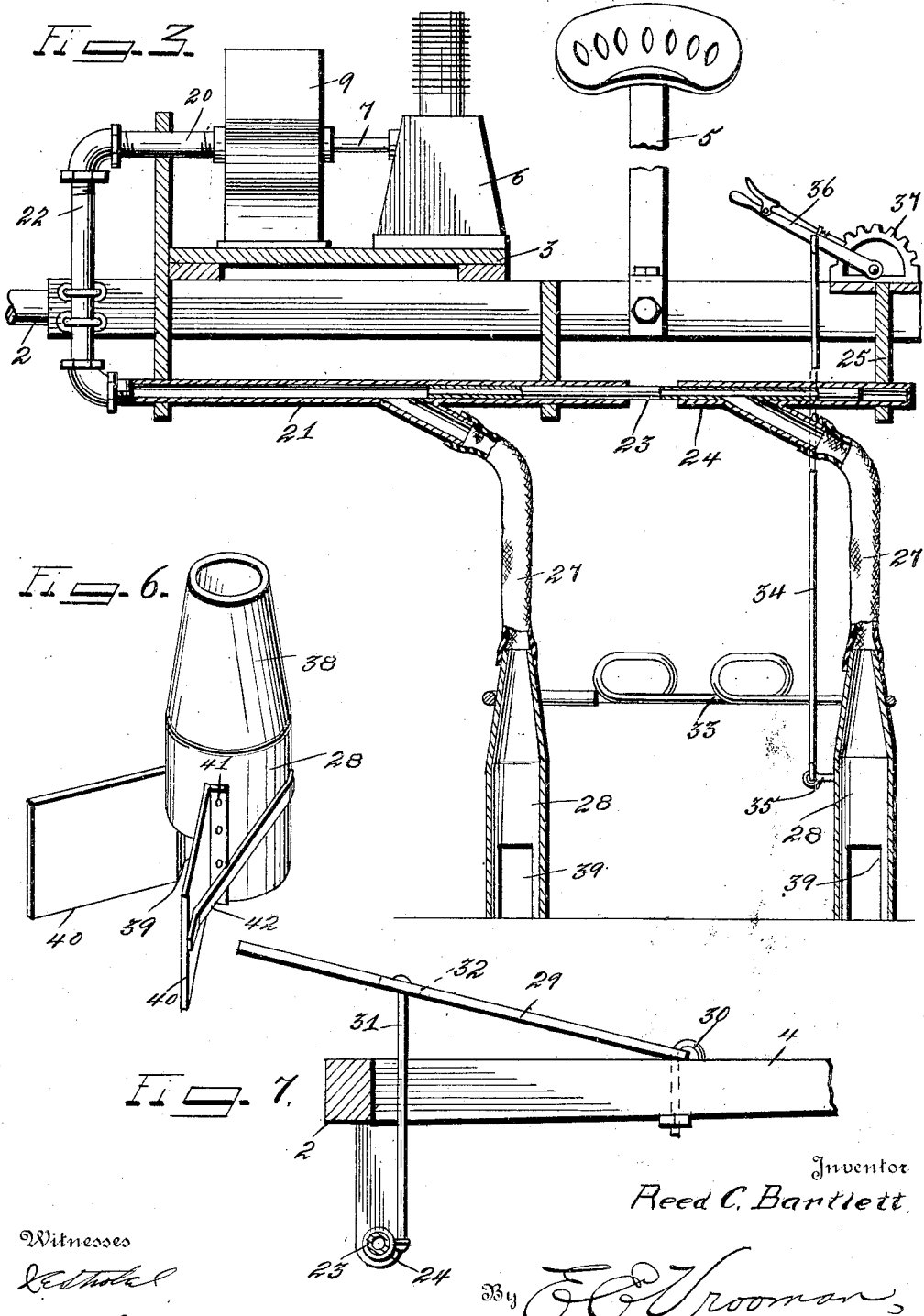

UNITED STATES PATENT OFFICE.

REED C. BARTLETT, OF WAUPACA, WISCONSIN.

BUG AND WORM COLLECTOR.

1,108,882.  Specification of Letters Patent.  Patented Sept. 1, 1914.

Application filed October 17, 1913. Serial No. 795,766.

*To all whom it may concern:*

Be it known that I, REED C. BARTLETT, citizen of the United States, residing at Waupaca, in the county of Waupaca and State of Wisconsin, have invented certain new and useful Improvements in Bug and Worm Collectors, of which the following is a specification, reference being had therein to the accompanying drawing.

This invention relates to bug and worm collectors and has for its object the production of an efficient means for guiding the plants into the funnels adapted to draw the bugs from the plants so as to efficiently extract or remove the bugs from the plants.

The present invention is an improvement upon the structure illustrated in my Patent No. 1,060,417, issued on April 30th, 1913, and has a special reference to the construction of the hoods which engage the plants as above described.

A still further object of the invention is the production of efficient means for adjusting the hoods both laterally and vertically to accommodate themselves to different width rows of plants.

With the above and other objects in view this invention consists of certain novel combinations, constructions and arrangements of parts as will be hereinafter fully described and claimed.

In the accompanying drawings:—Figure 1 is a side elevation of the exterminator or collector. Fig. 2 is a front elevation showing the chute in transverse section. Fig. 3 is a section taken on line 3—3, of Fig. 2. Fig. 4 is an enlarged top plan view of one end of the collector. Fig. 5 is a central longitudinal section through the suction fan and refuse bag. Fig. 6 is a detail perspective of one of the collecting hoods. Fig. 7 is a longitudinal section through a portion of the frame work showing the manner of supporting the shifting lever for moving the hoods laterally of the frame of the machine. Fig. 8 is a detail perspective of the chute door carried within the refuse bag. Fig. 9 is a detail perspective of the shifting lever adapted to move the hoods laterally.

By referring to the drawings it will be seen that 1 designates the supporting wheels which carry the central axle 2. This axle 2 supports a frame 3 to which is connected the shafts 4, and a seat 5 for the convenience of the operator is mounted upon this platform 3. A motor 6 of any desired type such as a gasolene or electrical motor is placed upon the platform 3 and carries a shaft 7, which shaft in turn carries a fan 8 mounted in the fan suction casing 9. The suction casing 9 is also mounted upon the platform 3 and is provided with a discharge spout 10 to which a pipe 11 is connected. This pipe 11 is connected at its opposite end to a collar portion 12 carried by the platform 3 which collar portion surrounds a discharge aperture 13, whereby the bugs which are drawn into the suction casing 9 are discharged into the refuse bag or receptacle 14. This refuse bag or receptacle 14 is supported upon the under face of the platform 3 by means of hooks 15 and a hinge chute 16 is connected to the under face of the platform 3 in the manner as illustrated in Fig. 5. The opposite end of the hinge chute 16 is supported upon the depending bolts 17 which bolts pass through the longitudinally extending slots 18 formed in the chute 16. Screws 19 are threaded upon the bolts 17 whereby the pitch of the chute 16 may be regulated to accommodate itself to the different size or shape of the receptacle 14 which may be used in connection with the present invention.

A delivery pipe 20 communicates with the suction casing 9 as indicated in Fig. 2 and this pipe connects to a transversely extending pipe 21 which passes under the frame of the vehicle and communicates with the pipe 20 by means of the vertically extending pipe 22. This pipe 21 is provided with a longitudinal adjusting section 23 which fits in the pipe 21 and connects the same to the stub section 24, which stub section 24 of the pipe is supported by means of the bracket 25 below the vehicle. The pipe 21 and stub section 24 of said pipe are each provided with angularly extending chute portions 26 which engage flexible tubes 27 and these tubes 27 carry the axles or hoods 28 at their lower ends. It should be understood that these tubes may be either made flexible or rigid owing to the work which is adapted to be accomplished by the machine.

A laterally shifting lever 29 is pivotally connected to one of the shafts 4 by means of an eye 30 and engages a depending rod 31 which rod works in the longitudinally extending slot 32 formed in the lever 29. The lower end of the rod 31 is connected to the stub section 24 of the pipe 21 for the purpose of moving the same laterally upon the machine, whereby the distance between the two hoods or spouts 28 may be regulated. It should be understood that the pipe 23 is slidably mounted within the stub section 24 to accommodate the free sliding movement of the stub section 24. An adjusting slide bar 33 is connected to the hoods or funnels 28 for the purpose of holding the same in alinement and this slide bar may of course move longitudinally to permit the lateral adjustment of the hoods 28. These hoods 28 may be elevated by means of a depending rod 34 which rod is connected to an eye 35 carried by one of the hoods and the other end of the rod 34 is connected to an operating lever 36 which lever works upon a quadrant 37. By moving the hoods 28 vertically the same may be readily adjusted to accommodate themselves to different height plants.

All of the hoods 28 comprise a tubular body portion terminating in a funnel shape upper end 38 over which the lower end of the tubes 27 are adapted to fit. The hoods 28 are provided with notched portions 39 therein so as to allow the plants to pass therethrough, and upon the front of the hoods 28 are placed divergingly extending guide plates 40, which plates are provided with angle portions 41 for permitting the same to be conveniently secured to the body of the hoods. Rearwardly extending braces 42 are connected to the rear face of the plates 40 and extend rearwardly and engage the body of the hoods to constitute an efficient brace therefor. It should be understood that these guide plates 40 will efficiently gather the plants together and guide the same into the hoods whereby the suction from the fan 8 will draw the bugs from the plants up into the fan casing 9 whereupon the bugs will be killed by the rotation of the fan and delivered into the refuse receptacle 14.

From the foregoing description it will be seen that a very efficient device has been produced, whereby the plants may be guided into the hoods 28 for allowing the plants to be readily acted upon by the suction from the fan 8.

It should be understood that this invention may be modified as to its detail mechanical construction without departing from the spirit of the invention.

Having thus described the invention what is claimed as new, is:—

1. A bug and worm collector comprising a frame, a plurality of suction hoods, means for creating a suction therein, a suction pipe communicating therewith, said suction pipe comprising a plurality of sections, a lever engaging said suction pipe and adapted to be swung laterally for moving said hoods laterally, a second lever, a link connected to said second lever and said hoods and adapted to move said hoods vertically.

2. A bug and worm collector comprising a frame, a plurality of suction hoods, a suction pipe, means for creating a suction therethrough, said suction pipe provided with a plurality of suction spouts, means for connecting said spouts and said hoods, means for vertically and laterally adjusting said hoods, a refuse receptacle, a hinge chute carried by said frame and positioned within said refuse receptacle, rods engaging said chute, and means engaging the lower end of said rods for adjusting the angle of said chute.

3. A bug and worm collector comprising a frame, a plurality of suction hoods, means for creating a suction therein, each hood comprising a body having a tapered upper end, said body provided with a plurality of notched sides, divergingly extending plates secured to said sides for directing plants to said hoods, and braces engaging said body and also engaging said divergingly extending plates for bracing the same against rearward movement.

In testimony whereof I hereunto affix my signature in presence of two witnesses.

REED C. BARTLETT.

Witnesses:
ETHEL A. WEST,
EDWARD E. BROWNE.